United States Patent
Chang

Patent Number: 5,950,314
Date of Patent: Sep. 14, 1999

[54] STEP-SEPARATING SHEARING TOOL

[76] Inventor: Jung-Hsien Chang, 7F-2, No.5. Fu An 7 Street, Fu An Li, Shi-Tun Chu, Taichung, Taiwan

[21] Appl. No.: 08/905,940

[22] Filed: Aug. 5, 1997

[51] Int. Cl.[6] .................................................... B26B 13/00
[52] U.S. Cl. ................................ 30/244; 30/250; 30/254; 30/261
[58] Field of Search .............................. 30/239, 238, 237, 30/254, 251, 252, 191, 341, 340, 259, 244, 194, 250, 261; 81/415, 416, 417, 427, 427.5, 342, 348, 362, 394, 407, 411

[56] References Cited

U.S. PATENT DOCUMENTS

| 147,223 | 3/1874 | Collings | 30/238 |
|---|---|---|---|
| D. 346,538 | 5/1994 | Florian | D8/5 |
| D. 367,410 | 2/1996 | Hortnagl | D8/5 |
| D. 367,594 | 3/1996 | Hortnagl | D8/5 X |
| D. 380,128 | 6/1997 | Wu | D8/5 |
| D. 390,761 | 2/1998 | Choi | D8/5 |
| 2,066,716 | 1/1937 | Cruickshank | 81/411 |
| 2,144,180 | 1/1939 | Cruickshank | 81/427 |
| 2,512,334 | 6/1950 | Johnson | 30/251 |
| 3,390,455 | 7/1968 | Florian | 30/251 |
| 3,460,251 | 8/1969 | Somervell | 30/254 |
| 4,084,317 | 4/1978 | Nakamura et al. | 30/251 X |
| 4,094,064 | 6/1978 | Nishikawa et al. | 30/251 X |
| 5,511,314 | 4/1996 | Huang | 30/251 |

FOREIGN PATENT DOCUMENTS

| 93911 | 10/1896 | Germany | 30/259 |
|---|---|---|---|

*Primary Examiner*—M. Rachuba
*Attorney, Agent, or Firm*—Smith, Gambrell & Russell, LLP; Beveridge, DeGrandi, Weilacher & Young Intellectual Property Group

[57] ABSTRACT

A step-separating shearing tool includes a first handle and a second handle. A first blade portion is connected to the first handle, and a second blade portion, which includes an L-shaped slot, is hinge-connected to the first blade portion and to the first handle. A rocker arm connects the second handle and the first blade portion. The step-separating shearing tool also includes an automatic step-separating mechanism. This mechanism includes: a double-oscillating rod, which is hinge-connected to the rocker arm; a slider on the double oscillating rod, which is received in the L-shaped slot of the second blade portion; and a torsion spring connected between the rocker arm and the double oscillating rod. When the shearing tool is used in a cutting operation for cutting items having a relatively small diameter, the slider is located in a short slot portion of the L-shaped slot during the entire cutting operation. However, when the shearing tool is used in a cutting operation for cutting items having a relatively large diameter, the slider is located in a long slot portion of the L-shaped slot during a first part of the cutting operation, to partially cut through the item being cut, and then the slider is moved to the short slot portion of the L-shaped slot during a second part of the cutting operation.

4 Claims, 9 Drawing Sheets

STEP-SEPARATING SHEARING TOOL

FIELD OF THE INVENTION

The present invention relates to a step-separating shearing tool, and more particularly to a step-separating shearing tool that can automatically adjust the step-separating shearing function in accordance with the extent that the handles must be opened, which depends on the sectional dimension of the items to be cut. The step-separating shearing operation using the device of the invention provides for convenient and labor saving operation.

BACKGROUND OF THE INVENTION

In general, the use of shearing tools is very popular, especially, for gardening. While the functional development of shearing tools has been greatly upgraded, there are still some shortcomings in the popular shearing tools used nowadays, and thus, improvements are desirable. The listing below describes some of the disadvantages of popular shearing tools used today:

1. As shown in FIG. 1, this shearing tool is of a structure such that it can be operated by one hand. The structure includes two blades 2, each connected to a separate handle 1. The handles 1 are cross-connected by a hinged bolt. A compression spring 3 is installed between the two handles 1. The compression spring 3 makes the two handles 1 maintain a constant opening angle. When it is necessary to shear an item having a small diameter, the operator's hand needs to hold and compress both the handles 1 and the compression spring 3 first in order to reduce the opening angle of the blades 2 before the tool can begin to carry out the shearing action. This idle stroke of holding and compressing is useless with respect to the shearing action, and on the contrary; it causes waste of labor in applying the shearing force. Furthermore, the extent of opening of the blades is greatly limited, and therefore, this tool cannot be used for shearing items with a large diameter. This limitation greatly reduces the usefulness of this tool.

2. As shown in FIG. 2, generally, this shearing tool is of a structure such that it is operated by two hands of the user. The upper blade portion 4 is connected to the handle 5, while the lower blade portion 6 is hinge-connected to the handle 8 through a connecting rod 7. Moreover, one end of the handle 8 is hinge-connected to the upper blade portion 4. The benefits of this tool, however, cannot be fully used when it comes to cutting items with a small diameter owing to the reason that its benefit in applying shearing force is at a maximum when the handle 8 extends at an appropriate opening angle. On the contrary, it is inconvenient to apply force with this tool when it is necessary to cut items with a small diameter and the handles 5 and 8 are opened only at a small opening angle. Similarly, this same problem will occur before one finishes cutting items with a large diameter. Moreover, in cutting items with a large diameter, the handle 8 must be opened at a large opening angle, which will result in wasted labor and is inconvenient for the operator during the shearing operation. Therefore, this tool also needs to be improved.

In view of this situation, the inventor, with his accumulated years of working experience and through his persistent study in design works, developed a shearing tool that can automatically adjust depending on the sectional dimension of the items to be cut by controlling the extent that the handles need to open and by keeping the handles in the range of the optimum shearing angle opening for attaining the maximum shearing benefit. This is the aim of the design of the present invention.

SUMMARY OF THE INVENTION

The primary objective of the present invention is to provide a step separating shearing tool that, by making use of the design of an automatic step separating mechanism, can carry out automatic step separating shearing depending on the sectional dimension of the items to be cut. When the tool is used to shear items with a small diameter, the handles place the operator's hands such that the shearing operation is carried out with labor-saving by using an angle opening range for optimum force application. When it shears items with a relatively large diameter, the blade portion extends at a large angle to contain the items to be cut, while at the same time the tool automatically performs a step that reduces the opening angle of the handles. This angle reducing step places the handles into the range of optimum opening angles for carrying out shearing action until the item to be cut is sheared up to a certain extent, and then the tool returns to the configuration used for cutting items of small diameter. In this way, the tool enables the handles to be persistently maintained in the range for optimum force application in the overall shearing process, which thereby provides the benefits of labor-saving and convenient operation.

In order to allow the reader to understand the present invention in more detail, the author describes a preferred embodiment, which is also illustrated in the attached drawings.

NUMBER INDEX FOR THE FIGURES

| 10: | Upper blade portion | 11: | Lower blade portion |
|---|---|---|---|
| 12: | Handle | 13: | Handle |
| 14: | Rocker arm | 15: | Hinge |
| 16: | Hinge | 17: | Double oscillating rod |

-continued

| 18: | Hinge | 19: | Slider |
|---|---|---|---|
| 20: | L-type slot | 20A: | Lock-in point |
| 20B: | Point of inflection | 20C: | Propped-up point |
| 21: | Torsion spring | | |

DETAILED DESCRIPTION OF THE INVENTION

Figure 1:
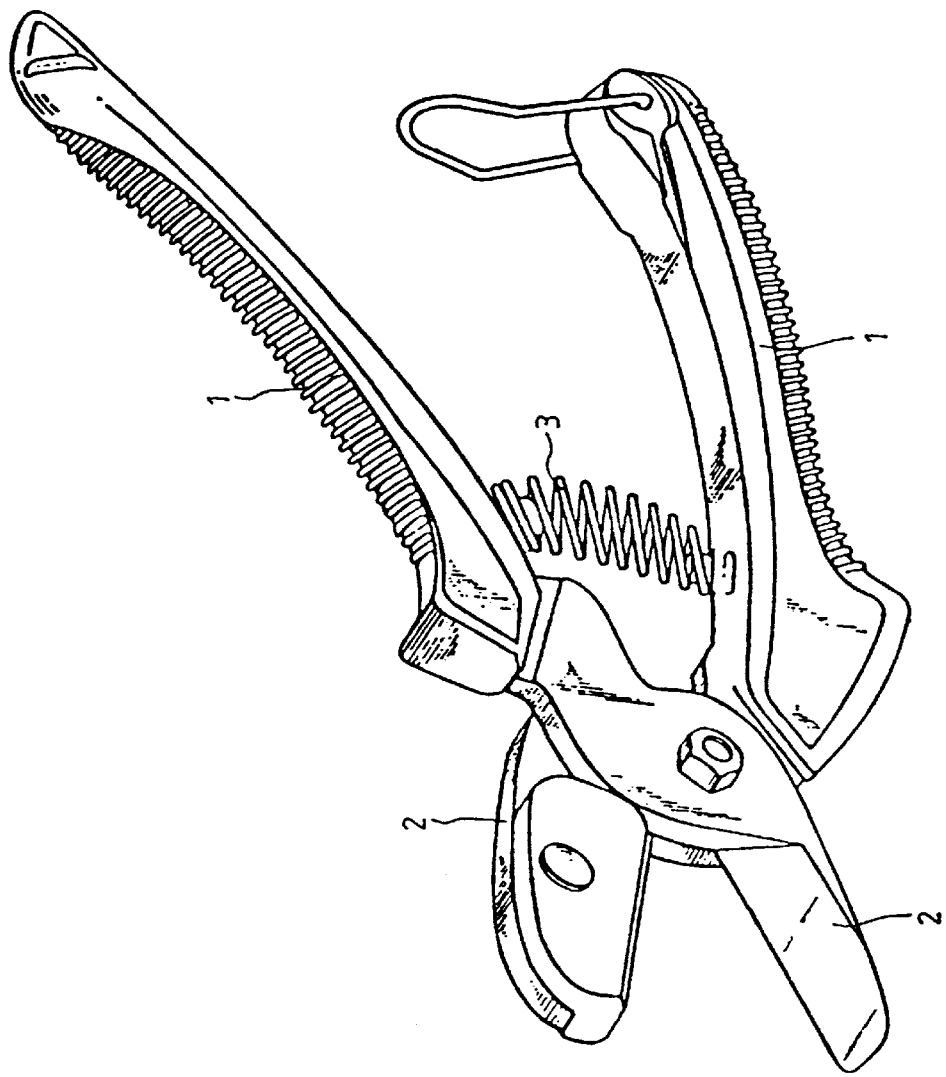
FIG. 1 is a schematic diagram of a shearing tool of the prior art.
Figure 2:
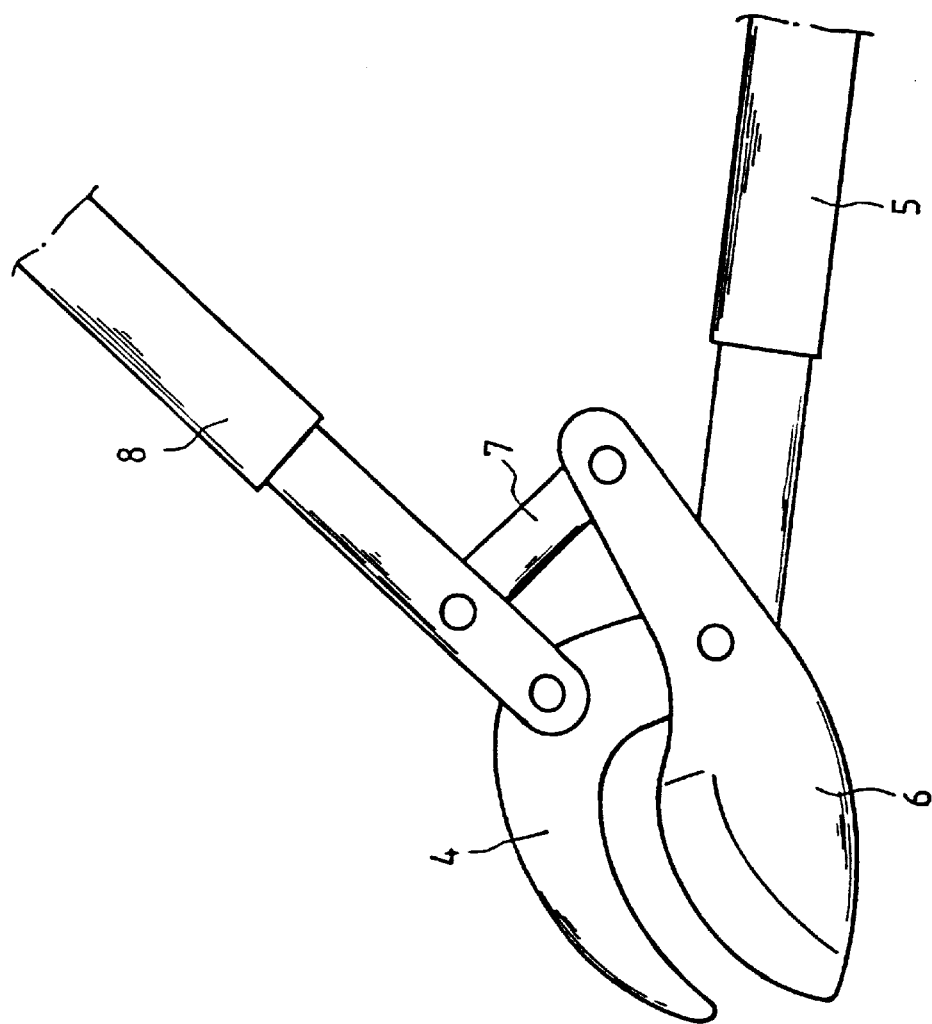
FIG. 2 is a schematic diagram of another kind of shearing tool of the prior art.
Figure 3:
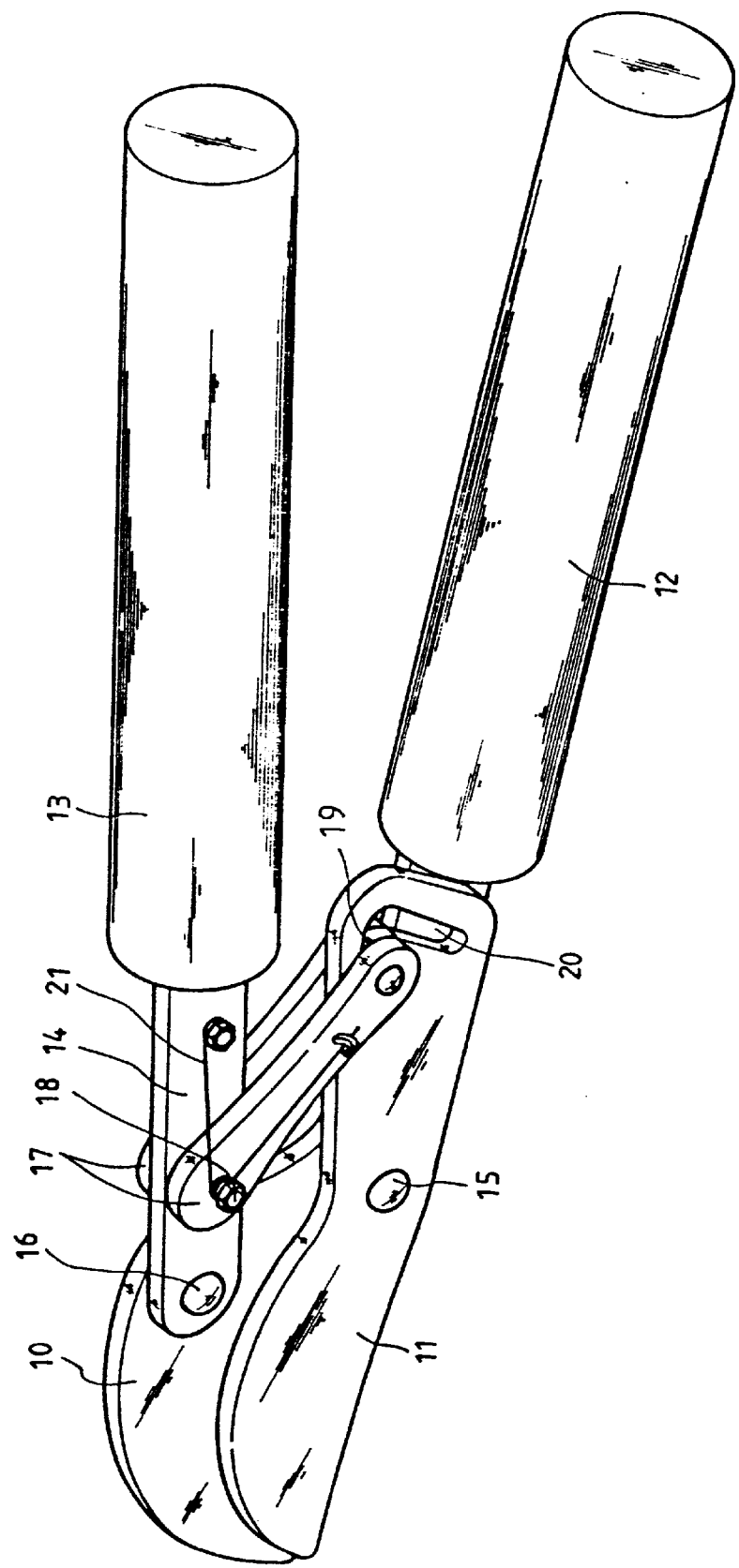
FIG. 3 is a pictorial drawing of the outward appearance of a shearing tool according to the present invention.

As shown in FIG. 3, the step-separating shearing tool of the present invention includes an upper blade portion 10, a lower blade portion 11, handles 12 and 13, a rocker arm 14, and an automatic step-separating mechanism, which will be described in more detail below. The rear end of the upper blade portion 10 is connected to the handle 12, while the lower blade portion 11 is hinge-connected to the upper blade portion 10 by a hinge 15. The handle 13 is connected to the rocker arm 14, which is also connected to the upper portion of the upper blade 10 by a hinge 16.

The automatic step-separating mechanism mainly makes use of a double-oscillating rod 17, which has one end connected to the rocker arm 14 by a hinge 18 and the other end connected to a slider 19. The slider 19 is fitted in an L-type slot 20 (also called an "L-shaped slot" in this patent specification) set up at the lower blade 11. A torsion spring 21 is provided at the hinge 18, wherein one end of the torsion spring 21 is pressed against the rocker arm 14 and the other end is pressed against the double-oscillating rod 17. By means of this mechanism, when the handle 13 rotates to open with respect to the hinge 16, it can cause the double-oscillating rod 17 to perform a change of step in accordance with the extent of opening of the handle 13. This enables the shearing tool to adapt to the different dimensions of the items to be cut.

Figure 4:
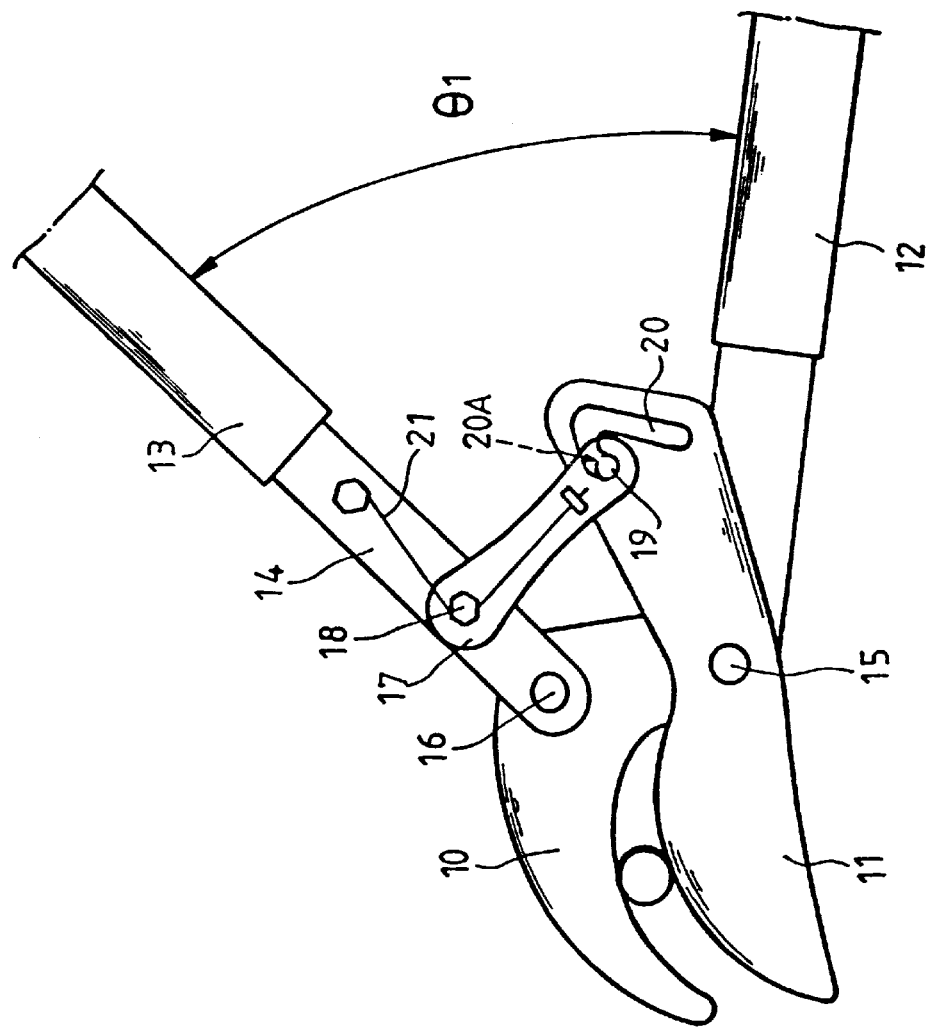
FIG. 4 is a schematic drawing of a shearing tool according to the present invention applied in shearing items with a small diameter.

As shown in FIG. 4, when the shearing tool according to the present invention is used in shearing items with a small diameter, the handle 13 is opened, which causes the slider 19 to pull the lower blade 11 such that it is rotated with respect to the hinge 15. This movement opens the blades 10 and 11 so they can contain the item to be cut, which has a small diameter. Because the slider 19 is located at the lock-in point 20A of the short slot portion in the L-type slot 20, the handles 12 and 13 still have an appropriate opening angle $\theta_1$ for force application, and this opening angle will not be too small for the small diameter of the item to be cut. When force is applied to close the handles 12 and 13, the double oscillating rod 17 props against the lower blade portion 11 by the slider 19 to shear items between the upper blade portion 10 and the lower blade portion 11. In this arrangement, the shearing tool possesses good shearing effect and applies good shearing force.

Figure 5:
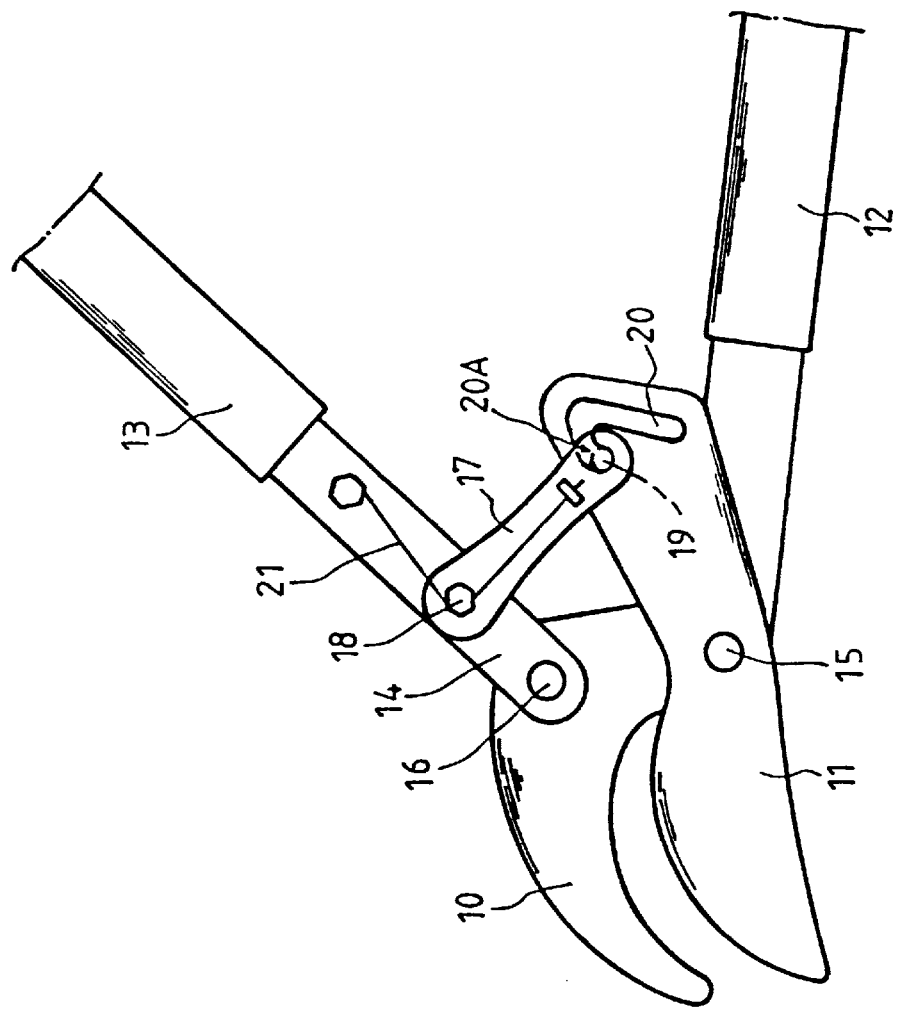
FIG. 5 is a schematic drawing of a shearing tool according to the present invention in a first position when used in shearing items having a large diameter.
Figure 6:
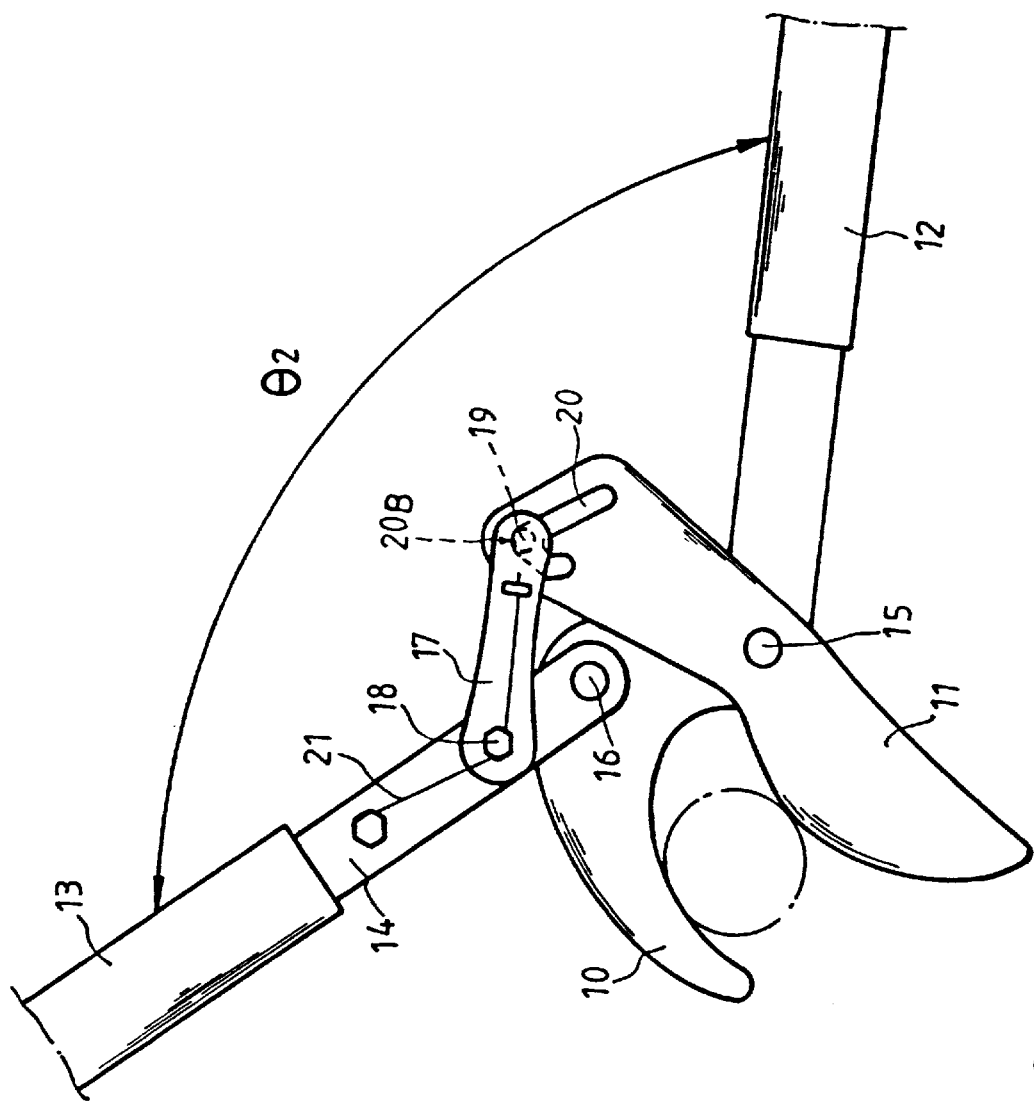
FIG. 6 is a schematic drawing of a shearing tool according to the present invention in a second position when used in shearing items having a large diameter.

As shown in FIG. 5, when the present invention is used in shearing items with a large diameter, the handle 13 first is opened until the opening angle where the slider 19 of the double oscillating rod 17 is located at the lock-in point 20A at the short slot portion in the L-type slot 20. This position is the same as the one used in shearing items with a small diameter, as described above in conjunction with FIG. 4. Then, as shown in FIG. 6, as the operator continues to open the handle 13, this action will drive the slider 19 to separate from the lock-in point 20A at the short slot portion, and the torsion spring 21 will pull the oscillating rod 17 to oscillate it. At the same time, while the slider 19 pulls the lower blade portion 11 to rotate it to open, the slider 19 will automatically slide along the short slot portion of the L-type slot 20 to the point of inflection 20B. As the handle 13 keeps opening further, the slider 19 will pull the lower blade portion 11 to rotate until the blades 10 and 11 are opened to the extent that the blades 10 and 11 can contain the large diameter item to be cut. At this moment, the angle between handles 12 and 13 will be $\theta_2$.

Figure 7:
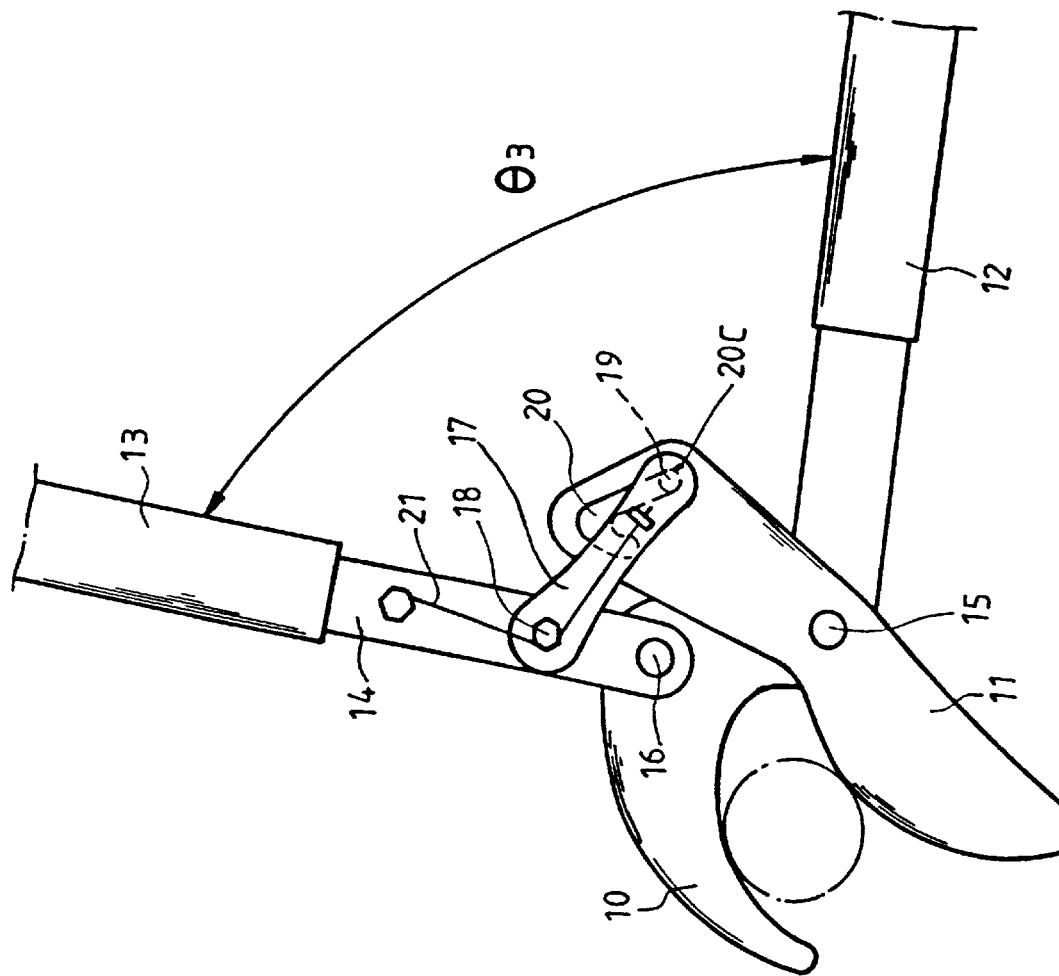
FIG. 7 is a schematic drawing of a shearing tool according to the present invention in a third position when used in shearing items having a large diameter.

Because this angle $\theta_2$ is rather large, it will be very much inconvenient for performing the shearing operation. Therefore, it is necessary to reduce the angle from $\theta_2$ to facilitate the shearing work. As shown in FIG. 7, after the handle 13 opens at an angle $\theta_2$, in order to contain large diameter items to be cut, the handles 12 and 13 are then pressed to close. At this moment, handle 13 will push the slider 19 of the oscillating rod 17 to slide along the long slot portion of the L-type slot 20 toward the handle 12. While this moving distance does not contribute any shearing action, it conveniently reduces the opening angle between the handles 12 and 13 down to $\theta_3$. At this angle, the handles can be adapted to provide shearing action for applying force by the two hands of the operator, and when the handles 12 and 13 are pressed to close, the slider 19 will slide until it hits the propped-up point 20C, and the lower blade 11 will rotate to contain large diameter items to be cut together with the upper blade 10.

Figure 8:
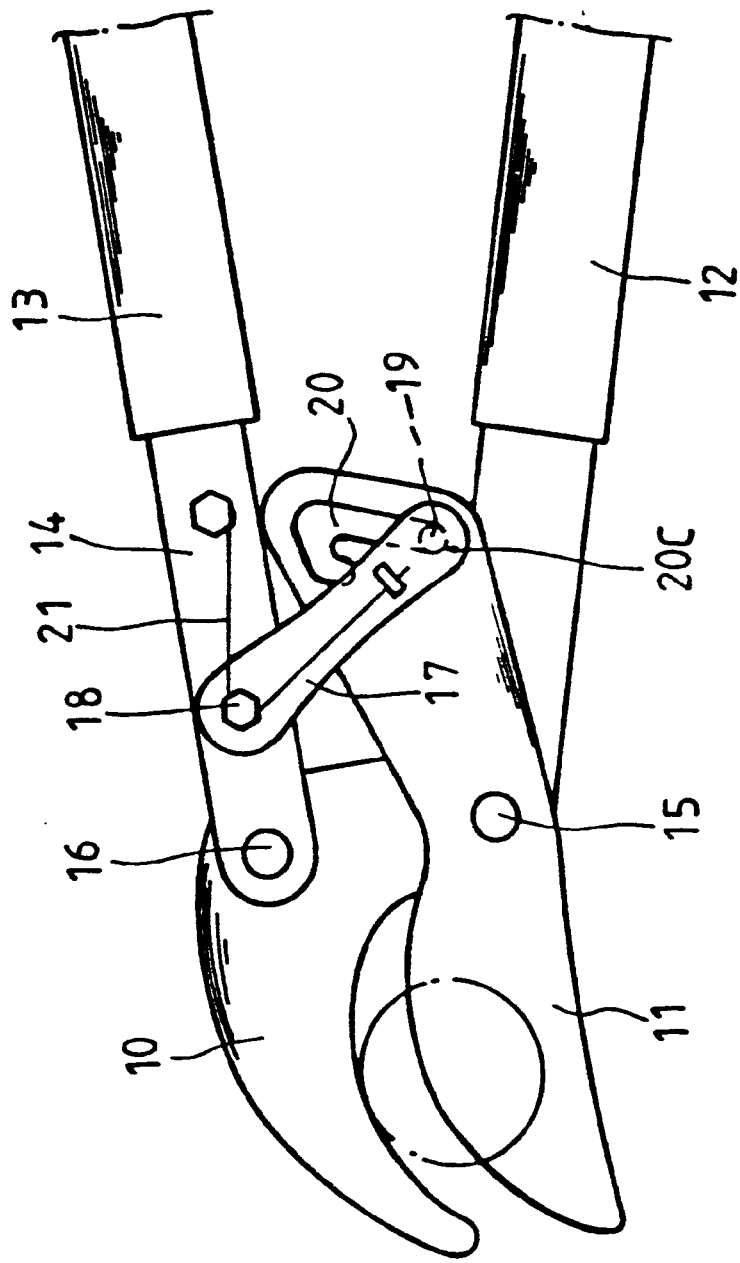
FIG. 8 is a schematic drawing of a shearing tool according to the present invention in a fourth position when used in shearing items having a large diameter.
Figure 9:
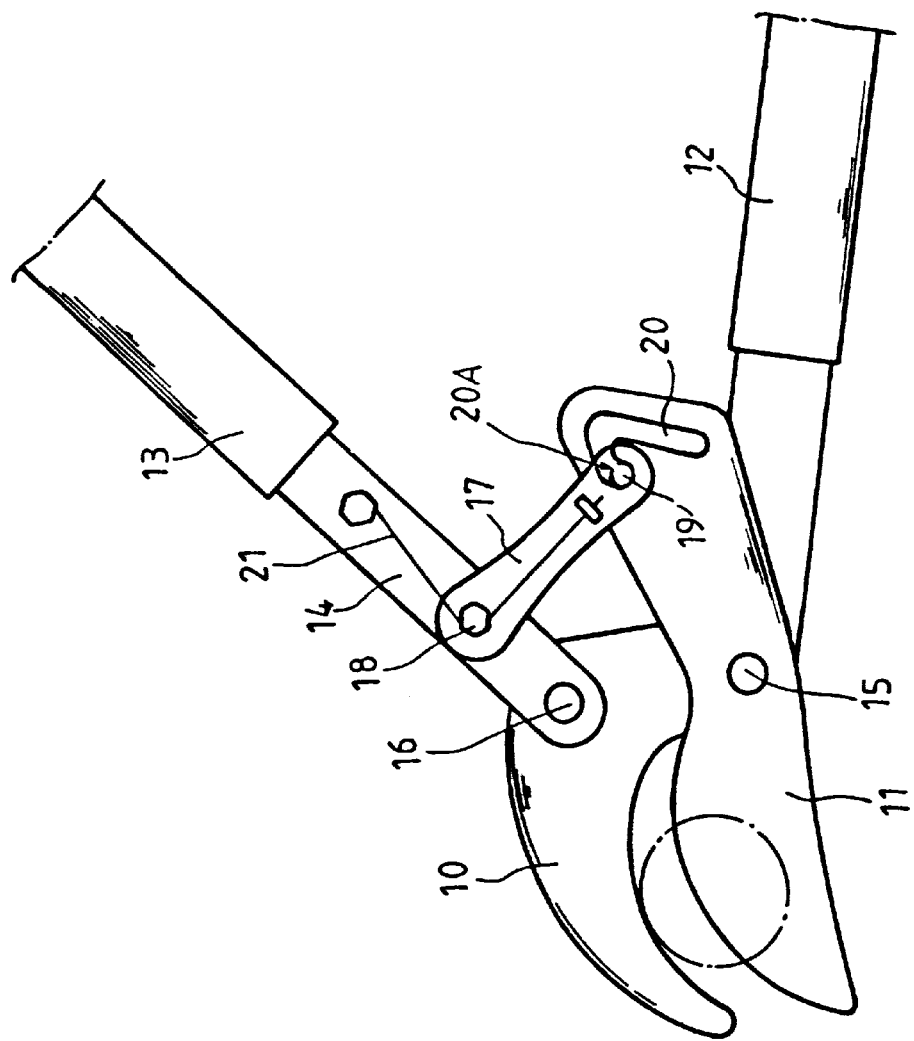
FIG. 9 is a schematic drawing of a shearing tool according to the present invention in a fifth position when used in shearing items having a large diameter.

As shown in FIG. 8, the shearing tool shears the large diameter item to be cut until the rocker arm 14 presses against the rear end of the lower blade portion 11, at which point the handles 12 and 13 are unable to close further. The purpose of this design is to avoid shearing with a small angle between the handles 12 and 13 in order to avoid the problem of not being able to apply force at this small angle. As shown in FIG. 9, after shearing the large diameter item to be cut to a certain extent as shown in FIG. 8, the operator opens the handle 13 and makes the double oscillating rod 17 drive the slider 19 to slide along the L-type slot 20 until it reaches the point of inflection 20B. Here, the double oscillating rod 17 is pulled by the torsion spring 21 to make the slider 19 return automatically back to the lock-in point 20A. This action returns the tool to the same shearing type action used for shearing the small diameter items. The action of the shearing tool of the invention maintains the handles 12 and 13 at an appropriate opening angle to carry out the shearing operation with optimum benefit in a manner that will not cause difficult operation for applying force when it shears to the final stage and the angle between the handles becomes rather small.

As shown in FIGS. 4–9, the torsion spring 21 contacts the double oscillating rod 17 adjacent to the slider 19. Additionally, these figures show that the short slot portion of the L-shaped slot 20 extends substantially along a longitudinal direction of the second blade portion 11 and the long slot portion of the L-shaped slot 20 extends substantially transverse to this longitudinal direction.

In terms of the foregoing description, the present invention, by making use of the automatic step-separating mechanism, can automatically adjust the step-separating shearing operation in accordance with the extent of the opening of the handles, which depends on the dimension of the items to be cut. In the invention, the shearing tool possesses a much better closing shearing angle when it is used in shearing small diameter items, and when it is used in shearing large diameter items, it can automatically change the position of the handles at the time they are opened, thereby reducing the opening angle to enable the handles to remain at an appropriate shearing angle for applying shearing force. This feature allows the device of the invention to attain the object of being easy to use and labor-saving in the shearing operation.

To summarize the above-mentioned statements, the present invention is a progressive design, which is very practical in application such that it can provide the industry with useful commercial value.

Although the present invention has been illustrated and described with reference to the preferred embodiments thereof, it should be appreciated that it is in no way limited to the details of such embodiments. The skilled artisan will be capable of making numerous modifications to the preferred embodiment without departing from the invention as defined in the appended claims.

What is claimed is:

1. A step-separating shearing tool, comprising:

a first handle;

a second handle;

a first blade portion, including a first blade, wherein a first end of the first blade portion is connected to the first handle;

a second blade portion, including a second blade, wherein a first end of the second blade portion includes a single L-shaped slot having a short slot portion and a long slot portion longer than the short slot portion, and wherein the second blade portion is hinge-connected to the first blade portion and the second blade portion is hinge-connected to the first handle;

a rocker arm, wherein a first end of the rocker arm is connected to the second handle and a second end of the rocker arm is hinge-connected to the first end of the first blade portion; and an automatic step-separating mechanism, which includes:

a double-oscillating rod, wherein a first end of the double oscillating rod is hinge-connected to the rocker arm, a slider, located at a second end of the double oscillating rod, wherein the slider is received in the L-shaped slot of the second blade portion, and a torsion spring connected between the rocker arm and the double oscillating rod, wherein: (a) when the shearing tool is used in a cutting operation for cutting items having a first diameter, the slider is located in the short slot portion of the L-shaped slot during the entire cutting operation, and (b) when the shearing tool is used in a cutting operation for cutting items having a second diameter larger than the first diameter, the slider is located in the long slot portion of the L-shaped slot during a first part of the cutting operation and the slider is located in the short slot portion of the L-shaped slot during a second part of the cutting operation.

2. A step-separating shearing tool as claimed in claim 1, wherein the short slot portion of the L-shaped slot includes a lock-in point, wherein the slider is located at the lock-in point during cutting operations when the slider is located in the short slot portion.

3. A step-separating shearing tool as claimed in claim 1, wherein the long slot portion of the L-shaped slot includes a propped-up point, wherein the slider is located at the propped-up point during cutting operations when the slider is located in the long slot portion.

4. A step-separating shearing tool as claimed in claim 1, wherein the short slot portion of the L-shaped slot extends substantially along a longitudinal direction of the second blade portion and the long slot portion of the L-shaped slot extends substantially transverse to the longitudinal direction.

* * * * *